(12) United States Patent
Tamegai et al.

(10) Patent No.: US 10,186,959 B2
(45) Date of Patent: Jan. 22, 2019

(54) POWER SUPPLY CIRCUIT, CONTROL CIRCUIT THEREOF, AND ELECTRONIC APPARATUS

(71) Applicant: ROHM CO., LTD., Kyoto (JP)

(72) Inventors: Yoichi Tamegai, Kyoto (JP); Masashi Horimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 911 days.

(21) Appl. No.: 14/483,525

(22) Filed: Sep. 11, 2014

(65) Prior Publication Data

US 2015/0076906 A1 Mar. 19, 2015

(30) Foreign Application Priority Data

Sep. 13, 2013 (JP) ................ 2013-190899

(51) Int. Cl.
*H02M 3/158* (2006.01)
*H02M 3/156* (2006.01)
*H02J 7/00* (2006.01)
*H02M 1/00* (2006.01)

(52) U.S. Cl.
CPC .......... *H02M 3/156* (2013.01); *H02J 7/0065* (2013.01); *H02M 2001/0032* (2013.01); *H02M 2001/0045* (2013.01); *H02M 2001/0054* (2013.01); *Y02B 40/90* (2013.01); *Y02B 70/1491* (2013.01); *Y02B 70/16* (2013.01); *Y10T 307/406* (2015.04)

(58) Field of Classification Search
CPC ......... H02M 3/156; H02M 2001/0045; H02M 2001/0032; H02M 2001/0054; H02J 7/0065; Y02B 70/16; Y02B 70/1491; Y02B 40/90
See application file for complete search history.

(56) References Cited

U.S. PATENT DOCUMENTS

| 5,773,966 A * | 6/1998 | Steigerwald .......... H02M 3/158 323/284 |
| 2003/0067287 A1* | 4/2003 | Morgen .................. G05F 1/465 323/273 |
| 2005/0029872 A1* | 2/2005 | Ehrman .................... H02J 1/08 307/11 |

(Continued)

FOREIGN PATENT DOCUMENTS

| JP | 2006333637 A | 12/2006 |
| JP | 2009177909 A | 8/2009 |

OTHER PUBLICATIONS

Notification of Reasons for Refusal corresponding to Japanese Patent Application No. 2013-190899; dated May 26, 2017.

*Primary Examiner* — Rexford Barnie
*Assistant Examiner* — Terrence Willoughby
(74) *Attorney, Agent, or Firm* — Cantor Colburn LLP

(57) ABSTRACT

A power supply circuit including a DC/DC converter having switching elements and configured to receive an input voltage in an input line and generate an output voltage in an output line; and a linear regulator configured to receive the output voltage and supply a stabilized voltage to a load. The DC/DC converter switches between a switching mode to switch the switching elements and a bypass mode to put a switching element existing on a path from the input line to the output line, of the switching elements, in a full-on state and stop switching of the other switching element.

20 Claims, 8 Drawing Sheets

(56) References Cited

U.S. PATENT DOCUMENTS

| | | | |
|---|---|---|---|
| 2007/0210775 A1* | 9/2007 | Bothra | H02M 3/158 |
| | | | 323/283 |
| 2007/0279024 A1* | 12/2007 | Falvey | H02M 3/158 |
| | | | 323/280 |
| 2008/0168281 A1* | 7/2008 | MacInnes | G06F 1/26 |
| | | | 713/300 |
| 2009/0184700 A1 | 7/2009 | Kanayama | |
| 2010/0123443 A1* | 5/2010 | Grimm | H02M 3/156 |
| | | | 323/282 |
| 2012/0081086 A1* | 4/2012 | Van Dijk | H02M 3/158 |
| | | | 323/273 |
| 2012/0084584 A1* | 4/2012 | Lee | G06F 1/3287 |
| | | | 713/320 |
| 2013/0131771 A1* | 5/2013 | Lehmann | A61N 1/36125 |
| | | | 607/137 |

* cited by examiner

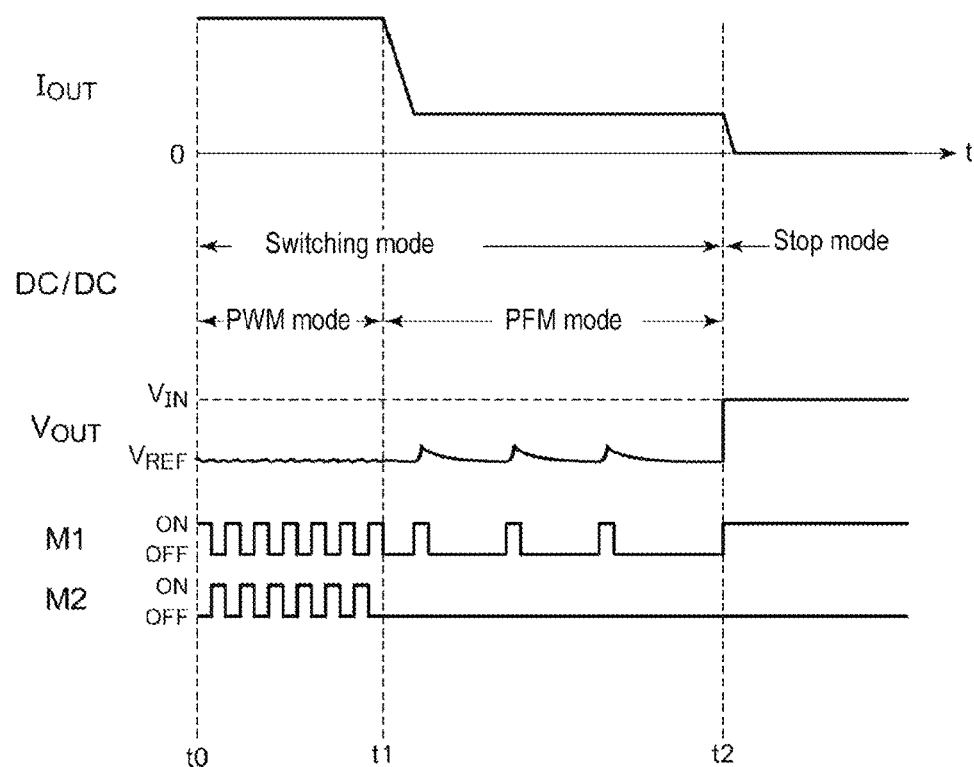

POWER SUPPLY CIRCUIT, CONTROL CIRCUIT THEREOF, AND ELECTRONIC APPARATUS

CROSS-REFERENCE TO RELATED APPLICATIONS

This application is based upon and claims the benefit of priority from Japanese Patent Application No. 2013-190899, filed on Sep. 13, 2013, the entire contents of which are incorporated herein by reference.

TECHNICAL FIELD

The present disclosure relates to a power supply.

BACKGROUND

A battery-driven electronic apparatus, such as a mobile phone, a tablet terminal, a notebook personal computer, a portable audio player, a digital camera and so on, is equipped with a secondary battery such as a lithium ion battery or the like and electronic circuits including a microcomputer, a LCD panel, an audio output circuit, a radio communication circuit and so on. Here, a power supply voltage to be supplied to each electronic circuit is different for each part. In addition, in order to supply a proper power supply voltage to each electronic circuit, a power supply circuit to step down or step up a battery voltage is equipped in the electronic apparatus.

FIGS. 1A and 1B are circuit diagrams showing an example of a power supply circuit equipped in an electronic apparatus. A power supply circuit 400 of FIG. 1A is a step-down DC/DC converter. The power supply circuit 400 steps doer an input voltage $V_{IN}$ (=$V_{BAT}$) from a battery 2 and supplies a power supply voltage $V_{OUT}$ to an electronic circuit (load 4) connected to an output line 402.

A consumption current of an electronic circuit contained in the electronic apparatus, i.e., a load current $I_{OUT}$ of the DC/DC converter 406, is varied in a large dynamic range depending on a state of the electronic apparatus. More specifically, the consumption current decreases to about zero in a standby mode of the electronic apparatus and increases from several hundred mA to several A in an active mode thereof.

In general, efficiency of a DC/DC converter decreases in a light load state with a small load current. This is because, even when the load current $I_{OUT}$, i.e., power supplied to the load 4, is decreased, power required to switch switching elements M1 and M2 (switching loss) is not decreased as much. In order to increase the efficiency in the light load state, there has been proposed a PFM (pulse frequency modulation) mode to decrease a switching frequency. However, even in the PEM mode, high efficiency is limited since the switching loss is not zeroed.

A power supply circuit 400a of FIG. 1B includes a linear regulator 404 in addition to the DC/DC converter 406. In the power supply circuit 400a of FIG. 1B, each of the linear regulator 404 and the DC/DC converter 406 switches between an active state and an inactive state independently. Depending on the load current $I_{OUT}$, by activating the DC/DC converter 406 in a range of heavy load state to light load state and activating the linear regulator 404 in a state with a smaller load current (referred to as a super light load state in the specification), high efficiency can be obtained in a wide range of the load current $I_{OUT}$.

However, in the power supply circuit 400a of FIG. 1B, the DC/DC converter 406 and the linear regulator 404 have their respective separate feedback loops. Therefore, when the DC/DC converter 406 and the linear regulator 404 are switched, feedback is interrupted, which results in output voltage variations such as overshoot, undershoot, ripple and so on, and thus it takes a long time to stabilize the output voltage.

In addition, since only the load 4 of one channel is driven, in order to supply different power supply voltages to various loads, there is a need to provide the power supply circuit 400a for each of the loads, which results in an increase in cost and circuit area.

SUMMARY

The present disclosure provides some embodiments of a power supply circuit and a control circuit thereof, which are capable of improving efficiency in a wide range of load currents.

According to one embodiment of the present disclosure, there is provided a power supply circuit including: a DC/DC converter including at least two switching elements and configured to receive an input voltage in an input line and generate an output voltage in an output line; and a linear regulator configured to receive the output voltage of the output line of the DC/DC converter, stabilize the received output voltage to a target level, and supply the stabilized voltage to a corresponding load, wherein the DC/DC converter is configured to switch between a switching mode to switch the switching elements such that the output voltage approaches the target level and a bypass mode to put a switching element existing on a path from the input line to the output line, of the switching elements, in a full-on state and stop switching of the other switching element.

In the bypass mode, the input voltage is directly supplied to the linear regulator, without being subjected to a voltage conversion by the DC/DC converter, via the full-on switching transistor and the output line in the DC/DC converter. Accordingly, by selecting the bypass mode in a super light load state with a very small sum of currents supplied to the load, a switching loss of the DC/DC converter can be substantially zeroed, which can result in an increase in overall efficiency of the power supply circuit.

The DC/DC converter may be a step-down type DC/DC converter including a switching transistor and a synchronous rectification transistor as the switching elements and, in the bypass mode, may fully turn on the switching transistor and turns off the synchronous rectification transistor.

The load connected to the linear regulator may be a microcomputer, and the DC/DC converter may select one of the switching mode and the bypass mode based on an instruction from the microcomputer.

The DC/DC converter may select the bypass mode when an electronic apparatus equipped with the power supply circuit enters a standby state.

The DC/DC converter may include a current detector to detect an output current and selects one of the switching mode and the bypass mode based on the amount of output current. With this configuration, since the control circuit can autonomously select a mode, the control circuit may be applied to various platforms.

The DC/DC converter may stop operations other than an operation of a circuit block required to fix a state of the switching element in the bypass mode. In this case, in a super light load state, an operating current of the DC/DC converter as well as a switching loss can be further decreased, which can result in higher efficiency.

When switching from the bypass mode to the switching mode, the DC/DC converter may set a target value of the output voltage to a value larger than a normal value and then decreases the target value to the normal value. In the bypass mode, the output voltage of the DC/DC converter increases over a normal target value and a large error may occur between the output voltage of the DC/DC converter and the normal target value immediately after switching from the bypass mode to the switching mode. With the above configuration, by smoothly changing the target value of the output voltage, the output voltage can follow the target value, thereby preventing variations in the output voltage due to mode switching.

The DC/DC converter may be configured to switch between a PWM (pulse width modulation) mode and a PFM (pulse frequency modulation) mode in the switching mode. When switching from the bypass mode to the switching mode, regardless of an amount of the output current of the DC/DC converter, the DC/DC converter may select the PWM mode temporarily and then select one of the PWM mode and the PFM mode based on the amount of output current. In the bypass mode, the output voltage of the DC/DC converter is larger than a normal target value. When switching from the bypass mode to the switching mode, since the output voltage cannot be decreased if the PFM mode is selected, it takes a long time to stabilize the output voltage to the normal target value. With the above configuration, by selecting the PWM mode when switching from the bypass mode to the switching mode, it is possible to stabilize the output voltage to the normal target value in a shorter time.

According to another embodiment of the present disclosure, there is provided an electronic apparatus including: a battery; one or more loads; and above-described power supply circuit, wherein the power supply circuit receives a voltage of the battery and supplies power to the one or more loads.

According to still another embodiment of the present disclosure, there is provided an electronic apparatus including: a battery; an application processor; a baseband processor; and the above-described power supply circuit configured to supply power to the application processor and the baseband processor.

The DC/DC converter may select one of the switching mode and the bypass mode based on an instruction from the application processor.

According to still another embodiment of the present disclosure, there is provided a control circuit of a power supply circuit for supplying power to one or more loads. The power supply circuit includes: a DC/DC converter including at least two switching elements and configured to receive an input voltage in an input line and generate an output voltage in an output line; and a linear regulator configured to receive the output voltage of the output line of the DC/DC converter, stabilize the received output line voltage to a target level, and supply the stabilized voltage to a corresponding load. The control circuit includes a controller configured to control an on/off state of the switching elements, and a switch between a switching mode to switch the switching elements such that the output voltage approaches the target level and a bypass mode to put a switching element existing on a path from the input line to the output line, of the switching elements, in a full-on state and stop switching of the other switching element.

With this configuration, it is possible to increase the overall efficiency in a super light load state.

Any combinations of the above-described elements or changes of the representations of the present disclosure between methods and apparatuses are effective as embodiments of the present disclosure.

BRIEF DESCRIPTION OF THE DRAWINGS

FIG. 3 is an operation waveform diagram of the power supply circuit of FIG. 2.

DETAILED DESCRIPTION

Figure 1A:
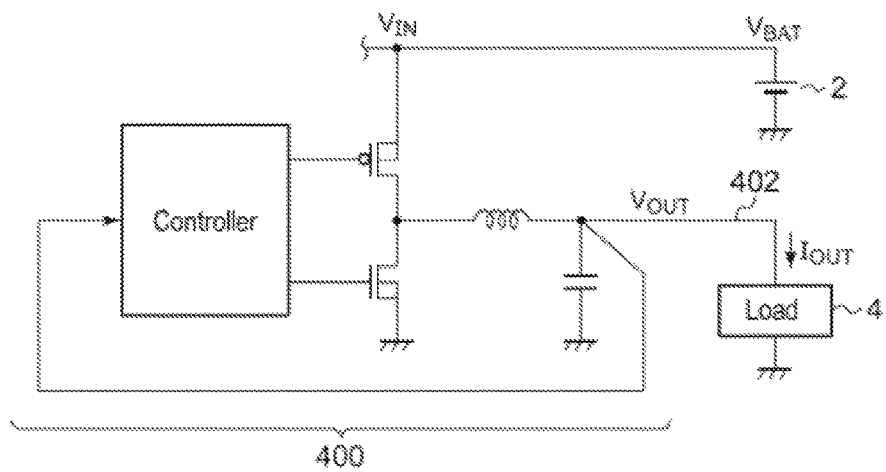
FIGS. 1A and 1B are circuit diagrams showing an example of a power supply circuit equipped in an electronic apparatus.

Some embodiments of the present invention will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

Figure 2:
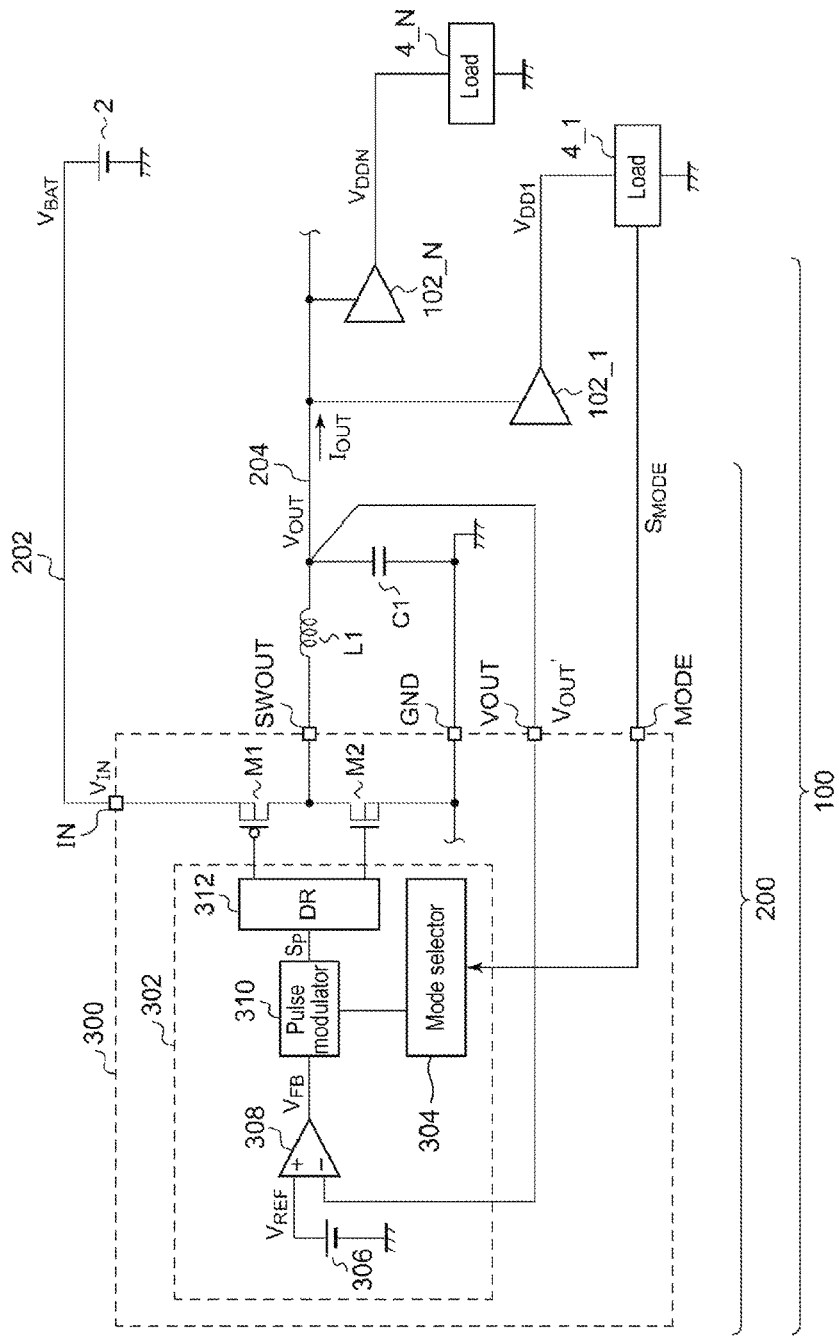
FIG. 2 is a circuit diagram showing a power supply circuit according to an embodiment.

FIG. 2 is a circuit diagram showing a power supply circuit 100 according to an embodiment. The power supply circuit 100 receives a battery voltage $V_{BAT}$ (also referred to as an input voltage $V_{IN}$) of a battery 2 and supplies N loads 4_1 to 4_N (N is a natural number) with power supply voltages $V_{DD1}$ to $V_{DDN}$ stabilized to an optimal voltage level, respectively. Along with the battery 2 and the loads 4, the power supply circuit 100 is equipped in an electronic apparatus such as a mobile phone, a tablet PC, a notebook PC, a potable audio player, a digital camera or the like.

The power supply circuit 100 includes N linear regulators 102_1 to 102_N and a DC/DC converter 200.

The DC/DC converter 200 includes at least two switching elements M1 and M2, receives the input voltage $V_{IN}$ at its input line 202, and generates a voltage $V_{OUT}$ at its output line 204.

The N linear regulators 102_1 to 102_N are provided in association with the N loads 4_1 to 4_N. Each of the linear regulators 102_1 to 102_N (also referred to as LDO (Low Drop Output)) is connected to the output line 204 of the DC/DC converter 200, receives the voltage $V_{OUT}$ of the output line 204, stabilizes the received voltage $V_{OUT}$ to its target level, and supplies the stabilized voltage $V_{OUT}$ to the corresponding load 4.

The DC/DC converter 200 is a step-down DC/DC converter and includes a control circuit 300, an inductor L1 and a capacitor C1. More specifically, the DC/DC converter 200 is of a synchronous rectification type and the switching elements M1 and M2 includes a switching transistor M1 and a synchronous rectification transistor M2.

The control circuit 300 is a functional IC (Integrated Circuit) integrated on a single semiconductor substrate. As used herein, the term "integrated" is intended to include both the case where all elements of a circuit are formed on a semiconductor substrate and the case where main elements of the circuit are integrated on the semiconductor substrate. In addition, some resistors, capacitors and the like for adjusting circuit parameters may be provided outside the semiconductor substrate.

Although, in this embodiment, the switching transistor M1 and the synchronous rectification transistor M2 are integrated in the control circuit 300, these transistors M1 and M2 may be external discrete elements attached to the IC.

In addition to the switching transistor M1 and the synchronous rectification transistor M2, the control circuit 300 includes a controller 302 for controlling, turning-on/off, of the switching transistor M1 and the synchronous rectification transistor M2.

The DC/DC converter 200 is configured to switch between a switching mode and a bypass mode. In the switching mode, the DC/DC converter 200 switches the switching elements M1 and M2 such that the voltage $V_{OUT}$ of the output line 204 approaches its target level. In the bypass mode, the DC/DC converter 200 stops the switching operation and puts a switching element existing on a path from the input line 202 to the output line 204, of the switching elements M1 and M2, for example, the switching transistor M1 in FIG. 2, in a full-on state and turns off the other switching element, for example, the synchronous rectification transistor M2 in FIG. 2.

The controller 302 includes, for example, a mode selector 304, a voltage source 306, an error amplifier 308, a pulse modulator 310 and a driver 312. The mode selector 304 selects one of the bypass mode and the switching mode and indicates the selected mode to other circuit blocks.

For example, the load 4_1 is a microcomputer (or microcontroller) for controlling the electronic apparatus integrally. Since the microcomputer 4_1 controls an overall operation of the electronic apparatus, it detects not only its own operation conditions (for example, current) but also conditions of other loads 4_2 and 4_N under its control. In such an electronic apparatus, the microcomputer 4_1 can know a sum of operating currents of all loads 4_1 to 4_N, i.e., an amount of output current (load current $I_{OUT}$) of the DC/DC converter 200. In other words, the microcomputer 4_1 can know whether or not the DC/DC converter 200 is in a super light load state. Thus, the microcomputer 4_1 outputs a mode control signal $S_{MODE}$, which indicates whether or not the DC/DC converter 200 is in the super light load state, to a mode terminal MODE of the control circuit 300.

For example, the microcomputer 4_1 asserts (for example, high-levels) the mode control signal $S_{MODE}$ in the super light load state. The mode selector 304 selects the bypass mode when the mode control signal $S_{MODE}$ is asserted. On the other hand, the mode selector 304 selects the switching mode when the mode control signal $S_{MODE}$ is negated.

As one example, the microcomputer 4_1 asserts the mode control signal $S_{MODE}$ when the electronic apparatus is in a standby state. In this case, the mode control signal $S_{MODE}$ may be asserted based on a standby signal generated by the microcomputer 4_1.

In addition, the microcomputer 4_1 asserts the mode control signal $S_{MODE}$ when the sum of operating current of the loads 4_1 to 4_N exceeds a predetermined threshold.

A detection voltage $V_{OUT}'$ based on the output voltage $V_{OUT}$ of the DC/DC converter 200 is fed back to a voltage detection terminal (VOUT terminal) of the control circuit 300. The detection voltage $V_{OUT}'$ may be either the output voltage $V_{OUT}$ itself or a voltage obtained by dividing the output voltage $V_{OUT}$. In the switching mode, the control circuit 300 controls the switching transistor M1 and the synchronous rectification transistor M2 such that the detection voltage $V_{OUT}'$ matches a predetermined target value.

The voltage source 306 generates a reference voltage $V_{REF}$ indicating a target value of the output voltage $V_{OUT}$. The error amplifier 308 amplifies an error between the reference voltage $V_1$ and the detection voltage $V_{OUT}'$ to generate an error signal $V_{FB}$. The pulse modulator 310, which is also called a duty controller, generates a pulse signal Sp having a duty cycle corresponding to the error signal $V_{FB}$.

The configuration of the pulse modulator 310 is not particularly limited but may be one known in the art or developed in the future. The pulse modulator 310 of the DC/DC converter 200 may employ one of a voltage mode, an average current mode, a peak current mode, a bottom detection on time fixation mode and a hysteresis control mode, which are known in the art.

More specifically, the pulse modulator 310 is configured to switch between a PWM (pulse width modulation) mode capable of achieving high efficiency in a heavy load state and a PFM (pulse frequency modulation) mode capable of achieving high efficiency in a light load state. The mode selector 304 selects one of the PWM mode and the PFM mode depending on the amount of load current $I_{OUT}$.

The driver 312 controls the switching transistor M1 and the synchronous rectification transistor M2 in response to the pulse signal Sp.

In the PWM mode, the switching transistor M1 and the synchronous rectification transistor M2 are complementarily switched at a predetermined frequency.

On the other hand, in the PFM mode, the synchronous rectification transistor M2 is fixed at a turning-off state and the switching transistor M1 is turned on for a predetermined period of time. When the switching transistor M1 is turned on for the predetermined period of time, a current is supplied to the capacitor C1 and the output voltage $V_{OUT}$ increases over the target value. Then, the output voltage $V_{OUT}$ decreases to the target value due to the load current $I_{OUT}$, and the switching transistor M1 is again turned on. This operation is repeated in the PFM mode. The PFM mode is known in the art and, therefore, explanation of an additional circuit configuration to implement the PFM mode will be omitted.

When the mode selector 304 selects the bypass mode in the super light load state, the DC/DC converter 200 stops an operation of circuit blocks other than a circuit block required to fix the synchronous rectification transistor M2 at the turning-off state and operating the switching transistor M1 as described above. For example, in the bypass mode, an oscillator, a current source and so on included in the pulse modulator 310 may be turned off and the operating current of the control circuit 300 may decrease to a minimal value.

The configuration of the power supply circuit 100 has been described above. Subsequently, an operation thereof will be described. FIG. 3 is an operation waveform diagram of the power supply circuit 100 of FIG. 2.

A period $T_{01}$ from time t0 to time t1 corresponds to a heavy load state in which the load current $I_{OUT}$ is larger than a predetermined value and the DC/DC converter 200 operates in the switching mode, more specifically, the PWM mode. During this period, the switching transistor M1 and the synchronous rectification transistor M2 of the DC/DC converter 200 are complementarily switched and the output voltage $V_{OUT}$ is stabilized to be close to its target value $V_{REF}$.

A period $T_{12}$ from time t1 to time t2 corresponds to a light load state in which the load current $I_{OUT}$ is decreased and the DC/DC converter 200 operates in the PFM mode. During this period, the synchronous rectification transistor M2 is fixed at a turning-off state and the switching transistor M1 is intermittently turned on at a frequency lower than that in the PWM mode. In the PFM mode, the output voltage $V_{OUT}$ is stabilized such that its bottom voltage is not lower than the reference voltage $V_{REF}$.

A period $T_{23}$ after time t2 corresponds to a super light load state in which the load current $I_{OUT}$ is decreased more than the light load state and the DC/DC converter 200 operates in the bypass mode. During this period, the switching transistor M1 is fixed at a full-on state, the synchronous rectification transistor M2 is fixed at the turning-off state, and the output voltage $V_{OUT}$ becomes substantially equal to the input voltage $V_{IN}$.

In either period, the power supply voltage $V_{DD}$ supplied to each load 4 is stabilized to the target value by the linear regulator 102.

The operation of the power supply circuit 100 has been described above. Subsequently, advantages thereof will be described.

In the power supply circuit 100, in the bypass mode, the input voltage $V_{IN}$ is directly supplied to each linear regulator, without being subjected to a voltage conversion by the DC/DC converter 200, via the switching transistor M1 in the full-on state, the inductor L1 and the output line 204 in the DC/DC converter 200. Accordingly, by selecting the bypass mode in the super light load state in which a very small sum of currents $I_{OUT}$ is supplied to the loads 4_1 to 4_N, a switching loss of the DC/DC converter 200 can be substantially zeroed.

Here, an overall efficiency of the power supply circuit 100 will be considered. For the purpose of brevity and easy understanding, a case where the load 4 is of one channel will be considered.

In the switching mode, it is assumed that a voltage drop $\Delta V$ of the DC/DC converter 200 is $V_{IN}-V_{OUT}$. For example, $V_{IN}$=4V and $V_{OUT}$=3.5V. In the bypass mode, a voltage drop in the DC/DC converter 200 is substantially zeroed, the voltage drop $\Delta V$ produced in the DC/DC converter 200 in the switching mode is passed onto the linear regulator 102, and a voltage drop of the linear regulator 102 is increased by $\Delta V$. Since a power loss $P_{LDO}$ of the linear regulator 102 is a product of a voltage drop $V_{DROP}$ and a load current $I_{LOAD}$, the power loss $P_{LDO}$ of the linear regulator 102 in the bypass mode is higher by A $P_{LDO}$ ($=I_{LOAD}\times\Delta V$) than that in the switching mode.

Accordingly, when the power loss $P_{LOAD}$ of the linear regulator 102 is smaller than the switching loss $P_{SW}$ when the DC/DC converter 200 operates in the PFM mode, it is possible to reduce an overall power loss of the power supply circuit 100 and achieve high efficiency by operating the DC/DC converter 200 in the bypass mode.

When the load current $I_{LOAD}$ is approximated to the output current $I_{OUT}$ of the DC/DC converter 200, it is possible to increase an overall efficiency of the power supply circuit 100, for example by defining an output current range satisfying the condition of $\Delta V\times I_{OUT}<P_{SW}$.

Further, $\Delta V$ is not constant in the actual DC/DC converter 200 and the overall loss of the power supply circuit 100 is required to consider an additional loss such as an operating current of the control circuit 300, in addition to the switching loss of the DC/DC converter 200 and the power loss of the linear regulator 102. Therefore, in actuality, it is advantageous to operate the DC/DC converter 200 in the bypass mode within a range in which the overall efficiency of the power supply circuit 100 is improved.

In addition, the power supply circuit 100 is superior in terms of costs and circuit areas, in addition to the efficiency. That is, the configuration of FIGS. 1A and 1B requires a number of DC/DC converters to supply various loads with different power supply voltages, which may result in an increase in cost and circuit area. In contrast, the power supply circuit 100 according to the embodiment has an ability to cope with a number of loads although the number of linear regulators is increased.

Figure 1B:
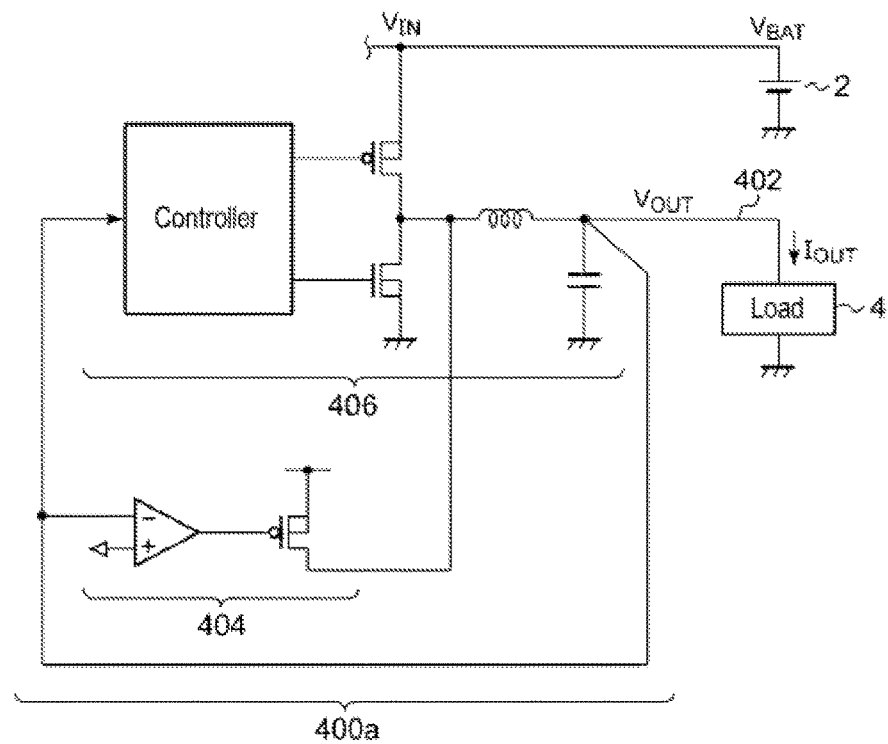

Further, the power supply circuit 100 has the following advantages over the power supply circuit 400a of FIG. 1B. In the power supply circuit 400a of FIG. 1B, a feedback is interrupted when switching the DC/DC converter 406 and the linear regulator 404, which may result in output voltage variations such as overshoot, undershoot, ripple and so on, and it takes a long time to stabilize the output voltage.

In contrast, with the power supply circuit 100 of FIG. 2, the DC/DC converter 200 and the linear regulator 102 are connected in series and the feedback loop of the linear regulator 102 is being operated at all times regardless of the mode of the DC/DC converter 200. Therefore, it is possible to suppress variations of the power supply voltage $V_{DD}$ appropriately unlike the configuration of FIG. 1B.

The advantages of the power supply circuit 100 have been described above. Subsequently, more specific controls of the power supply circuit 100 will be described.

In the power supply circuit 100, since the input voltage (i.e., $V_{OUT}$) of the linear regulator 102 is varied in a discontinuous manner when switching the DC/DC converter 200 between the switching mode and the bypass mode, a problem of a variation in the power supply voltage $V_{DD}$ may occur if a response speed of the linear regulator 102 is low.

Therefore, the following first control and second control may be performed when returning from the bypass mode to the switching mode.

(First Control)

When switching from the bypass mode to the switching mode, the DC/DC converter 200 sets the target value $V_{REF}$ of the output voltage $V_{OUT}$ to a value larger than a normal value and then decreases the target value $V_{REF}$ to the normal value. More specifically, when switching from the bypass mode to the switching mode, the voltage source 306 sets the reference voltage $V_{REF}$ to a value $V_{REFH}$ larger than a normal value $V_{REF\_NORM}$ and then decreases the reference voltage $V_{REF}$ to the normal value $V_{REF\_NORM}$.

Figure 4A:
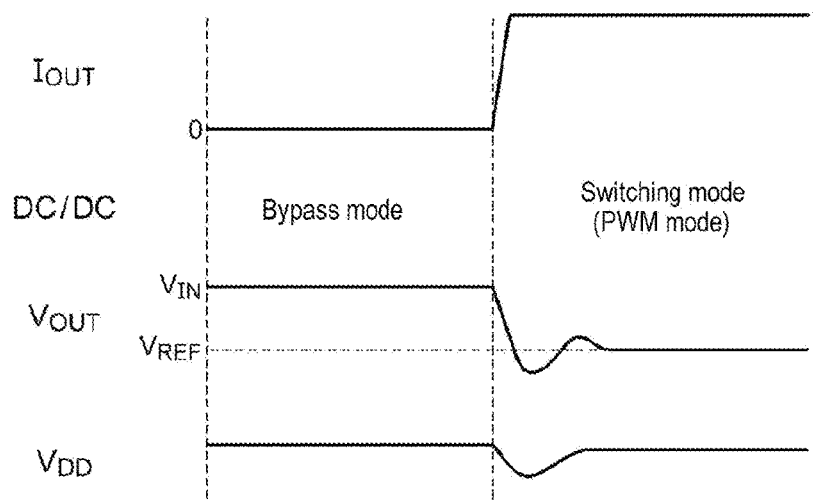
FIGS. 4A and 4B are operation waveform diagrams for illustrating a first control when a DC/DC converter returns from a bypass mode to a switching mode.
Figure 4B:
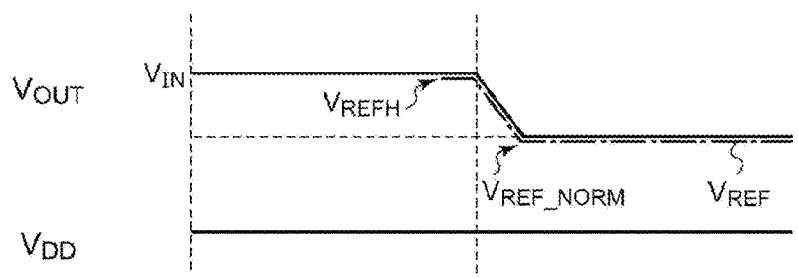

FIGS. 4A and 4B are operation waveform diagrams for illustrating the first control when the DC/DC converter 200 returns from the bypass mode to the switching mode. FIG. 4A shows a waveform when the first control is not performed and FIG. 4B shows a waveform when the first control is performed.

As shown in FIG. 4A, in the bypass mode, the output voltage $V_{OUT}$ of the DC/DC converter 200 increases to near the input voltage $V_{IN}$, which is higher than the target voltage $V_{REF}$ in the switching mode. In this condition, if a large error occurs between the output voltage $V_{OUT}$ and the target voltage $V_{REF}$ immediately after switching from the bypass mode to the switching mode, the output voltage $V_{OUT}$ may be undershot, which may result in ringing.

As shown in FIG. 4B, with the first control, the reference voltage $V_{REF}$ smoothly decreases from the higher voltage level $V_{REFH}$ to the original normal level $V_{REF\_NORM}$. This allows the DC/DC converter 200 to decrease the output voltage $V_{OUT}$ to the original target value $V_{REF\_NORM}$ while following the reference voltage $V_{REF}$. The reference voltage $V_{REF}$ may be set near the input voltage $V_{IN}$.

(Second Control)

When switching from the bypass mode to the switching mode, regardless of the amount of the output current $I_{OUT}$ of the DC/DC converter 200, the mode selector 304 of the DC/DC converter 200 selects the PWM mode temporarily and then selects one of the PWM mode and the PFM mode based on the amount of the output current $I_{OUT}$.

Figure 5A:
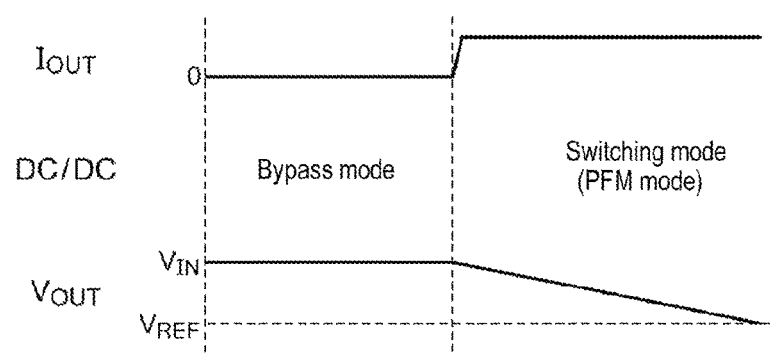
FIGS. 5A and 5B are operation waveform diagrams for illustrating a second control when the DC/DC converter returns from the bypass mode to the switching mode.
Figure 5B:
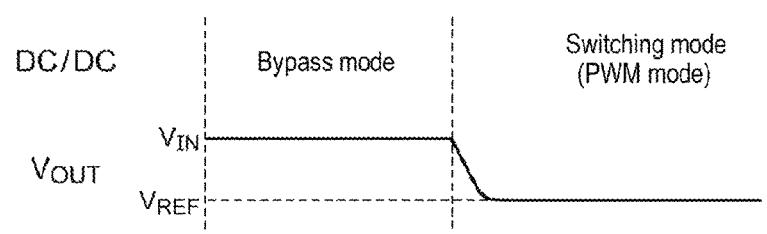

FIGS. 5A and 5B are operation waveform diagrams for illustrating the second control when the DC/DC converter 200 returns from the bypass mode to the switching mode. FIG. 5A shows a waveform when the second control is not performed and FIG. 5B shows a waveform when the second control is performed.

As shown in FIG. 5A, when switching from the bypass mode to the switching mode, the DC/DC converter 200 is in a light load state and the PFM mode is selected. In the PFM mode, since the synchronous rectification transistor M2 is fixed at the turning-off state, the capacitor C1 of the DC/DC converter 200 is discharged only by the linear regulator 102 (and its corresponding load 4). Accordingly, in the light load state with small load current $I_{OUT}$, the output voltage $V_{OUT}$ approaches its target value $V_{REF}$ at a slow rate, which may result in long time for stabilization of the DC/DC converter 200.

In contrast, as shown in FIG. 5B, with the second control, by selecting the PWM mode even in the light load state, the capacitor C1 can be discharged through the synchronous rectification transistor M2 in addition to the linear regulator 102, thereby allowing the output voltage $V_{OUT}$ to approach the target value $V_{REF}$ in a shorter time.

Figure 6A:
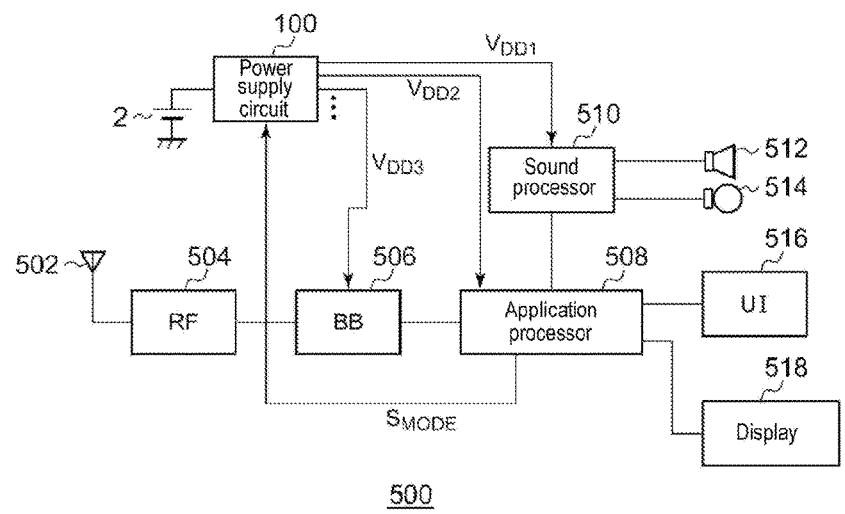
FIGS. 6A and 6B are a block diagram and an external view of an electronic apparatus including the power supply circuit of FIG. 2.
Figure 6B:
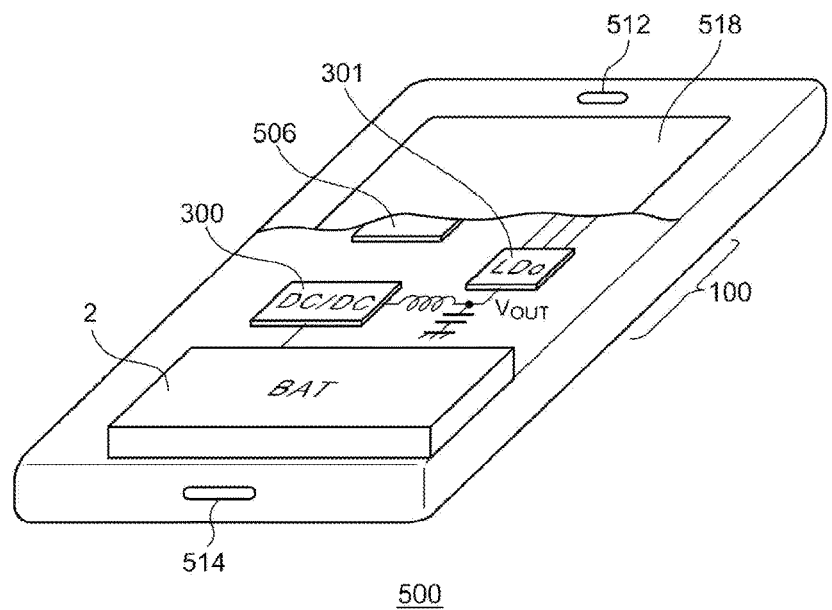

Subsequently, use of the power supply circuit 100 will be described. FIGS. 6A and 6B are a block diagram and an external view of an electronic apparatus 500 including the power supply circuit 100 of FIG. 2. The electronic apparatus 500 may be an apparatus having a wireless communication function, such as a mobile phone, a tablet PC or the like.

The electronic apparatus 500 includes an antenna 502, a radio frequency (RF) unit 504, a baseband processor 506, an application processor 508, a sound processor 510, an audio output unit 512, an audio input unit 514, a display unit 518 and a user interface unit 516.

The baseband processor 506 and the application processor 508 are integrated into one chip and control the electronic apparatus 500 integrally.

The RF unit 504 uses the antenna 502 to conduct radio communication with a base station (not shown). More specifically, the RF unit 504 modulates (or converts) a baseband signal output from the baseband processor 506 into a RF signal and emits a transmission frequency radio wave from the antenna 502. In addition, the RF unit 504 demodulates (or converts) a receiving signal from the base station received in the antenna 502 into the baseband signal which is then output to the baseband processor 506.

The user interface unit 516 may include a touch panel, a keyboard, a control IC thereof and so on. The application processor 508 detects a user input from the user interface unit 516.

The display unit 518 may include a liquid crystal display (LCD) or an organic electro-luminescence (EL) and a control IC thereof (display driver) and display image data generated by the application processor 508.

The sound processor 510 controls input/output of an audio signal. The sound processor 510 converts an audio signal generated by the application processor 508 into an analog signal which is then output to the audio output unit 512 such as a speaker and a headphone. In addition, the sound processor 510 converts an analog audio signal input to the audio input unit 514 such as a microphone into a digital signal which is then output to the application processor 508.

The power supply circuit 100 receives a voltage $V_{BAT}$ from the battery 2 and supplies power supply voltages $V_{DD1}$ to $V_{DD3}$ to the baseband processor 506, the application processor 508 and the sound processor 510 connected thereto as loads, respectively.

In the electronic apparatus 500, the application processor 508 or the baseband processor 506 may be a main processor to control the electronic apparatus 500 integrally and other circuit blocks are operated under control of the main processor. Therefore, the main processor can generate a control signal $S_{MODE}$ asserted in a super light load state, for example, a standby mode (including a sleeping mode and a deep sleeping mode) of the electronic apparatus 500 and transmit the generated control signal $S_{MODE}$ to the power supply circuit 100.

As shown in FIG. 6B, the linear regulators 102_1 to 102_N of the power supply circuit 100 are integrated into a single chip 301. In other embodiments, the linear regulators 102 may be integrated into the control circuit 300.

The particular embodiments of the present disclosure have been described above. However, these embodiments are only illustrative and it is to be understood to those skilled in the art that various modifications to combinations of elements or steps of the embodiments may be made without departing from the scope of the present disclosure, as will be described below.

(Modification 1)

Although it has been illustrated in the above embodiments that the determination on whether or not the DC/DC converter 200 is in the super light load state, in other words, the selection of one of the bypass mode and the switching mode of the DC/DC converter 200, is performed by a microcomputer such as the mode selector 304, the present disclosure is not limited thereto.

Figure 7:
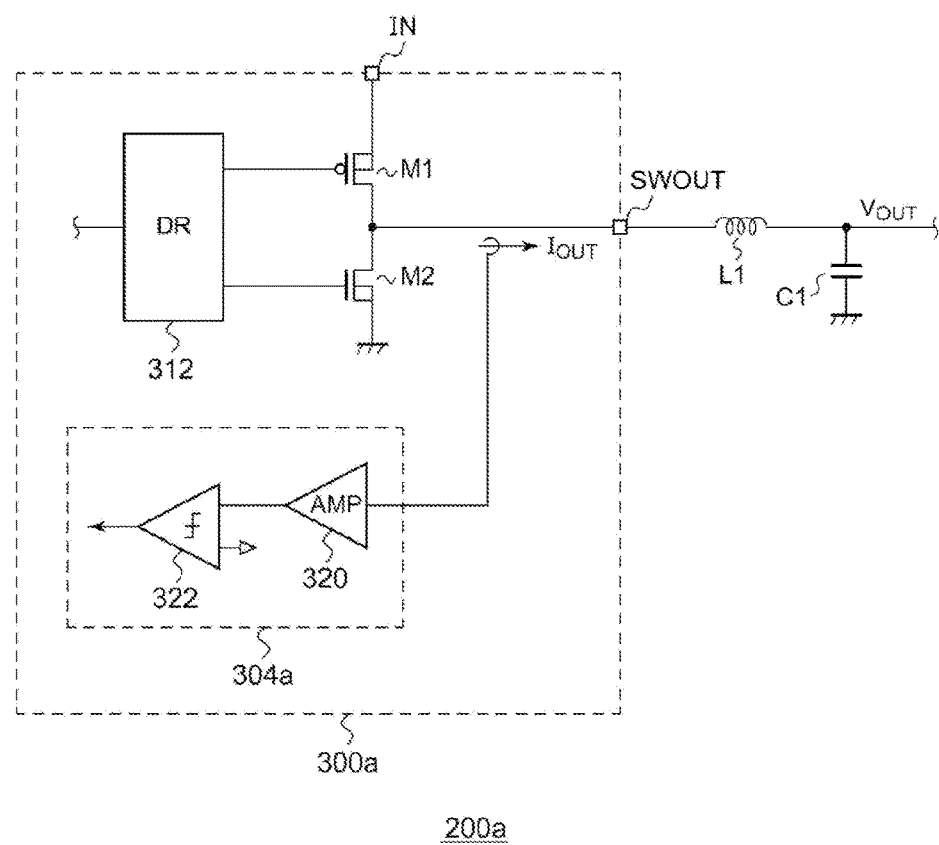
FIG. 7 is a circuit diagram of a control circuit according to Modification 1.

FIG. 7 is a circuit diagram of a control circuit 300a according to Modification 1. A mode selector 304a of the control circuit 300a includes a current detector 320 and a comparator 322. The current detector 320 detects an output current (load current) $I_{OUT}$ of a DC/DC converter 200a. For example, the current detector 320 may detect either a voltage drop of the switching transistor M1 or a voltage drop of a detection resistor disposed on a path of the load current $I_{OUT}$. In other words, a current detecting method of the current detector 320 is not particularly limited.

The comparator 322 compares a value of the load current $I_{OUT}$ detected by the current detector 320 with a threshold current $I_{TH}$ and selects one of the switching mode and the bypass mode based on a result of the comparison.

With this configuration, the control circuit 300a can autonomously select a mode. Thus, the control circuit 300a can be used for a platform in which a microcomputer cannot know the sum of the load current $I_{OUT}$ of the DC/DC converter 200a.

(Modification 2)

Figure 8:
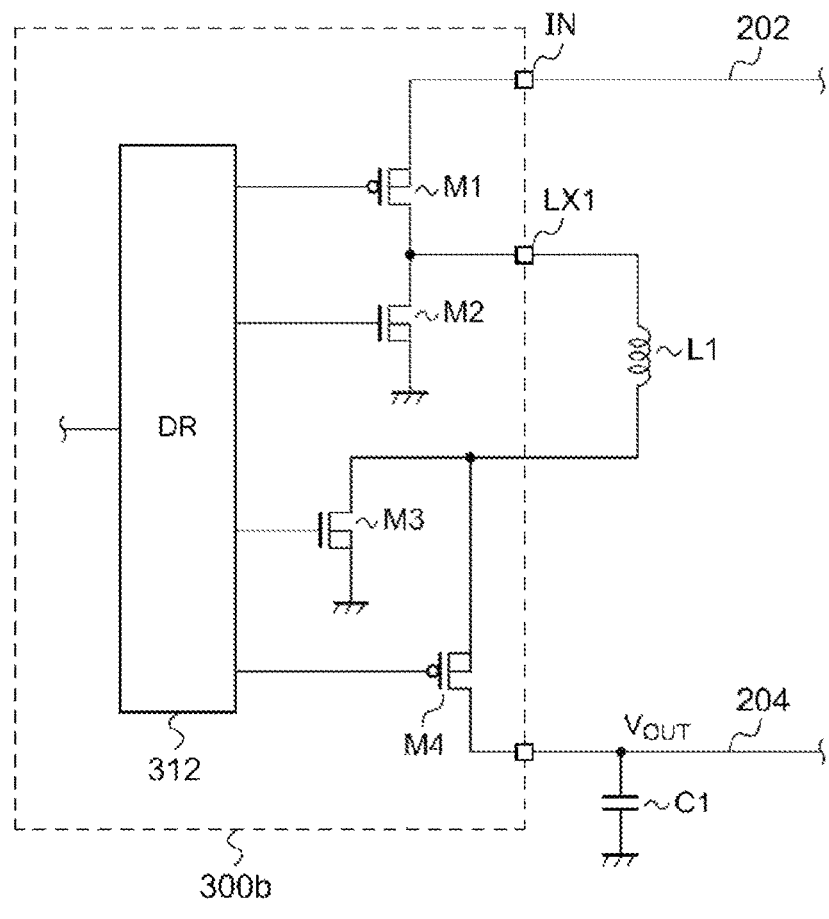
FIG. 8 is a circuit diagram of a DC/DC converter according to Modification 2.

Although it has been illustrated in the above embodiments that the DC/DC converter 200 is a step-down DC/DC converter, the present disclosure is not limited thereto. FIG. 8 is a circuit diagram of a DC/DC converter 200b according to Modification 2.

The DC/DC converter 200b is a step-up/step-down (or buck/boost) DC/DC converter and a control circuit 300b includes a second switching transistor M3 and a second synchronous rectification transistor M4 in addition to the switching transistor M1 and the synchronous rectification transistor M2 of FIG. 2.

In the switching mode for a step-down operation, the second switching transistor M3 is fixed at a turning-off state, the second synchronous rectification transistor M4 is fixed at a turning-on state, and the first switching transistor M1 and the first synchronous rectification transistor M2 are switching-controlled. In the switching mode for a step-up operation, the first switching transistor M1 is fixed at the turning-on state, the first synchronous rectification transistor M2 is fixed at the turning-off state, and the second switching transistor M3 and the second synchronous rectification transistor M4 are switching-controlled.

In the DC/DC converter 200b, in the bypass mode, the first switching transistor M1 and the second synchronous rectification transistor M4 positioned on a path from the input line 202 to the output line 204 are in a full-on state and the other switching elements M2 and M3 are fixed at an off state.

A power supply circuit including the DC/DC converter 200b according to Modification 2 can obtain the same advantages as the power supply circuit 100 of FIG. 2.

(Modification 3)

Diodes may be used instead of the synchronous rectification transistors M2 and M4 in the DC/DC converter 200 of FIG. 2 or the DC/DC converter 200b of FIG. 8.

According to the present disclosure in some embodiments, it is possible to improve efficiency in a wide range of load current.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply circuit comprising:
a DC/DC converter comprising at least two switching elements and configured to receive an input voltage in an input line and generate an output voltage in an output line; and
a linear regulator configured to receive the output voltage of the output line of the DC/DC converter, stabilize the received output voltage to a target level, and supply the stabilized voltage to a corresponding load,
wherein the DC/DC converter is configured to switch between a switching mode to switch the switching elements such that the output voltage approaches the target level and a bypass mode to put a switching element existing on a path from the input line to the output line, of the switching elements, in a full-on state and stop switching of the other switching element,
wherein the switching mode includes a PWM (pulse width modulation) mode and a PFM (pulse frequency modulation) mode, and
wherein, when switching from the bypass mode to the switching mode, a target value of the output voltage in the switching mode starts to smoothly decrease from a value that is larger than a normal value to the normal value, allowing the output voltage to decrease to the normal value while following the target value.

2. The power supply circuit of claim 1, wherein the DC/DC converter is a step-down type DC/DC converter comprising a switching transistor and a synchronous rectification transistor as the switching elements and, in the bypass mode, fully turns on the switching transistor and turns off the synchronous rectification transistor.

3. The power supply circuit of claim 1, wherein the load connected to the linear regulator is a microcomputer, and
wherein the DC/DC converter selects one of the switching mode and the bypass mode based on an instruction from the microcomputer.

4. The power supply circuit of claim 1, wherein the DC/DC converter selects the bypass mode when an electronic apparatus equipped with the power supply circuit enters a standby state.

5. The power supply circuit of claim 1, wherein the DC/DC converter includes a current detector to detect an output current and selects one of the switching mode and the bypass mode based on an amount of the output current.

6. The power supply circuit of claim 1, wherein the DC/DC converter stops operations other than an operation required to fix a state of the switching elements in the bypass mode.

7. The power supply circuit of claim 1, wherein the DC/DC converter is configured to switch between a PWM (pulse width modulation) mode and a PFM (pulse frequency modulation) mode in the switching mode, and
wherein, when switching from the bypass mode to the switching mode, regardless of an amount of an output current of the DC/DC converter, the DC/DC converter selects the PWM mode temporarily and then selects one of the PWM mode and the PFM mode based on the amount of the output current.

8. An electronic apparatus comprising:
a battery;
one or more loads; and
a power supply circuit of claim 1, wherein the power supply circuit receives a voltage of the battery and supplies power to the one or more loads.

9. An electronic apparatus comprising:
a battery;
an application processor;
a baseband processor; and
a power supply circuit configured to supply power to the application processor and the baseband processor,
wherein the power supply circuit comprises:
a DC/DC converter comprising at least two switching elements and configured to receive an input voltage of the battery in an input line and generate an output voltage in an output line;
a first linear regulator configured to receive the output voltage of the output line of the DC/DC converter, stabilize the received output voltage to a first target level, and supply the stabilized voltage to the application processor; and
a second linear regulator configured to receive the output voltage of the output line of the DC/DC converter, stabilize the received output line voltage to a second target level, and supply the stabilized voltage to the baseband processor,
wherein the DC/DC converter is configured to switch between a switching mode to switch the switching elements such that the output voltage approaches the first and second target levels and a bypass mode to put a switching element existing on a path from the input line to the output line, of the switching elements, in a full-on state and stop switching of the other switching element,
wherein the switching mode includes a PWM mode and a PFM mode, and
wherein, when switching from the bypass mode to the switching mode, a target value of the output voltage in the switching mode starts to smoothly decrease from a value that is larger than a normal value to the normal value, allowing the output voltage to decrease to the normal value while following the target value.

10. The electronic apparatus of claim 9, wherein the DC/DC converter selects one of the switching mode and the bypass mode based on an instruction from the application processor.

11. A control circuit of a power supply circuit configured to supply power to one or more loads,
wherein the power supply circuit comprises:
a DC/DC converter comprising at least two switching elements and configured to receive an input voltage in an input line and generate an output voltage in an output line; and
a linear regulator configured to receive the output voltage of the output line of the DC/DC converter, stabilize the received output voltage to a target level, and supply the stabilized voltage to a corresponding load,
the control circuit comprising:
a controller configured to control an on/off state of the switching elements and switch between a switching mode to switch the switching elements such that the output voltage approaches the target level and a bypass mode to put a switching element existing on a path from the input line to the output line, of the switching elements, in a full-on state and stop switching of the other switching element,
wherein the switching mode includes a PWM mode and a PFM mode,
wherein, when switching from the bypass mode to the switching mode, a reference voltage indicating a target value of the DC/DC converter in the switching mode starts to smoothly decrease from a value that is larger than a normal value to the normal value, allowing the output voltage to decrease to the normal value while following the reference voltage.

12. The control circuit of claim 11, wherein the DC/DC converter is a step-down type DC/DC converter comprising a switching transistor and a synchronous rectification transistor as the switching elements and, in the bypass mode, fully turns on the switching transistor and turns off the synchronous rectification transistor.

13. The control circuit of claim 11, wherein the load connected to the linear regulator is a microcomputer, and
wherein the controller selects one of the switching mode and the bypass mode based on an instruction from the microcomputer.

14. The control circuit of claim 11, wherein the controller selects the bypass mode when an electronic apparatus equipped with the power supply circuit enters a standby state.

15. The control circuit of claim 11, further comprising a current detector to detect an output current of the DC/DC converter,
wherein the controller selects one of the switching mode and the bypass mode based on an amount of the output current.

16. The control circuit of claim 11, wherein the controller stops operations other than an operation required to fix a state of the switching elements in the bypass mode.

17. The control circuit of claim 11, wherein the controller further comprises a voltage source to generate the reference voltage, and
wherein, when switching from the bypass mode to the switching mode, the voltage source sets the reference voltage.

18. The control circuit of claim 11, wherein the controller is configured to switch between a PWM mode and a PFM mode in the switching mode, and
wherein, when switching from the bypass mode to the switching mode, regardless of an amount of an output current of the DC/DC converter, the controller selects the PWM mode temporarily and then selects one of the PWM mode and the PFM mode based on the amount of the output current.

19. The control circuit of claim 11, wherein the control circuit is integrated on a single semiconductor substrate.

20. The power supply circuit of claim 1, wherein the value that is larger than the normal value is set close to the input voltage.

* * * * *